US012485561B2

(12) United States Patent
Dong et al.

(10) Patent No.: US 12,485,561 B2
(45) Date of Patent: Dec. 2, 2025

(54) LOCKING STRUCTURE OF FOLDING KNIFE BASED ON ELASTIC LOCKING PLATE

(71) Applicant: HUOXIONG GUANGZHOU TECHNOLOGY COMPANY LIMITED, Guangzhou (CN)

(72) Inventors: Yue Dong, Shanghai (CN); Liang Zhang, Foshan (CN)

(73) Assignee: HUOXIONG GUANGZHOU TECHNOLOGY COMPANY LIMITED, Guangzhou (CN)

( * ) Notice: Subject to any disclaimer, the term of this patent is extended or adjusted under 35 U.S.C. 154(b) by 155 days.

(21) Appl. No.: 18/363,871

(22) Filed: Aug. 2, 2023

(65) Prior Publication Data

US 2025/0026033 A1 Jan. 23, 2025

(30) Foreign Application Priority Data

Jul. 20, 2023 (CN) ......................... 202310893079.4

(51) Int. Cl.
*B26B 1/04* (2006.01)

(52) U.S. Cl.
CPC ................ *B26B 1/04* (2013.01); *B26B 1/042* (2013.01); *B26B 1/044* (2013.01)

(58) Field of Classification Search
None
See application file for complete search history.

(56) References Cited

U.S. PATENT DOCUMENTS 12,172,330 B2 * 12/2024 Wu ......................... B26B 1/048
2022/0410414 A1 * 12/2022 Dong ......................... B26B 1/10
2024/0408776 A1 * 12/2024 Zhang ..................... B26B 1/042
2025/0026033 A1 * 1/2025 Dong ...................... B26B 1/042

FOREIGN PATENT DOCUMENTS

CN 204532976 U 8/2015
CN 205660751 U 10/2016
CN 212415944 U 1/2021
CN 222521380 U * 2/2025

OTHER PUBLICATIONS

English translation of CN-222521380-U, date Feb. 25, 2025.*

* cited by examiner

*Primary Examiner* — Hwei-Siu C Payer
(74) *Attorney, Agent, or Firm* — Zhigang Ma

(57) ABSTRACT

A locking structure of folding knife based on an elastic locking plate comprises a knife handle and a blade. The knife handle is provided with an accommodating groove and a locking structure; the locking structure comprises a pivot, an elastic locking plate and an unlocking button. The blade is connected to the pivot, and a guide groove is defined on the pivot; A front end of the elastic locking plate is arranged in the guide groove; the elastic locking plate is provided with a locking part, and the blade is provided with a locking groove; the unlocking button is arranged on the pivot, the unlocking button abuts against one side of the locking plate, and the pivot is provided with an elastic resetting member.

8 Claims, 11 Drawing Sheets

LOCKING STRUCTURE OF FOLDING KNIFE BASED ON ELASTIC LOCKING PLATE

CROSS-REFERENCE TO RELATED APPLICATIONS

The application claims priority to Chinese patent application No. 2023108930794, filed on Jul. 20, 2023, the entire contents of which are incorporated herein by reference.

TECHNICAL FIELD

The disclosure relates to a locking structure of folding knife based on an elastic locking plate.

BACKGROUND

The statements herein only provide background information related to the present disclosure and do not necessarily constitute conventional technology.

As one of the most popular EDC (everyday carry) products, the folding cutter not only has the cutting function of the cutter itself, but also is favored by consumers for its convenience and playability in the use process, and consumers are particularly keen on the structural design of unlocking the blade. At present, there is a folding knife (such as linerlock locking mode) which is unlocked based on elastic locking plates. In case of unfolding the blade of the folding knife, after the blade is unfolded in place, due to the resilience of the elastic locking plate, the (locking part of) the elastic locking plate may be adapted to the (locking part of) the blade, thereby completing the locking. However, in case of unlocking this kind of folding knife, the elastic locking plate is usually pressed directly by fingers to deform (the locking parts of the elastic locking plate and the blade are separated), so as to realize unlocking, which has great security risks. Meanwhile, the existing design of the locking structure of folding knife based on elastic locking plates is not reasonable and clever enough to further ensure the resilience of the elastic locking plates, which carries the risk of deformation and distortion of the locking plates, leading to the hidden dangers of unstable locking and accidental unlocking.

Therefore, it is necessary to study a new technical solution to solve the above problems.

SUMMARY

In order to solve the defects and deficiencies of the conventional technology, a locking structure of folding knife based on an elastic locking plate is provided according to the present application, which uses the elastic locking plate as the main part of the folding knife locking. Compared to the folding knife that relies on springs as the main component for unlocking, the folding knife of this application is more secure. Meanwhile, the folding knife of this application further utilizes the elastic force of the spring to provide elastic force for locking, which greatly improves the reliability of tool locking.

In order to achieve the above object, the following technical scheme is adopted according to the present application:

A locking structure of folding knife based on an elastic locking plate, including a knife handle and a blade that can be folded on the knife handle, an accommodating groove adapted to the blade is defined on the knife handle, the accommodating groove is provided with a locking structure for locking the blade state; the locking structure includes a pivot, an elastic locking plate and an unlocking button;

The pivot is arranged in the accommodating groove, the blade is rotatably connected to the pivot, and a guide groove is defined on the pivot;

The elastic locking plate extends in a front-rear direction, a rear end of the elastic locking plate is fixedly connected with the knife handle, a front end of the elastic locking plate is movably arranged in the guide groove; the elastic locking plate is provided with a Z-shaped locking part, and the blade is provided with a locking groove adapted to the locking part;

the unlocking button may be movably arranged on the pivot, and one end of the unlocking button abuts against one side of the elastic locking plate, the pivot is provided with an elastic resetting member for driving the unlocking button to reset; when the blade is in the unfolded state, the locking part is located in the locking groove.

In some embodiments, the locking part is integrally formed with the elastic locking plate.

In some embodiments, the elastic locking plate is provided with a positioning part, the blade is provided with a positioning hole matched with the positioning part, and the positioning part is located in the positioning hole when the blade is rotatably accommodated in the knife handle.

In some embodiments, the accommodating groove is further provided with a limiting post, the blade is provided with a limiting groove matched with the limiting post; when the blade is fully unfolded, the limiting groove is limited by the limiting post.

In some embodiments, the knife handle includes a left liner, a connecting bone, a right liner, the left liner is connected to the left side of the connecting bone, and the right liner is connected to the right side of the connecting bone; where A rear end of the elastic locking plate is connected between the left liner and the connecting bone, or the rear end of the elastic locking plate is connected between the right liner and the connecting bone.

In some embodiments, the pivot is provided with a locking end cover, the locking end cover is provided with a guide shaft, the elastic resetting member is a spring, and the spring is sleeved on the guide shaft; moreover, the unlocking button is provided with a guide hole corresponding to the guide shaft, and the guide shaft extends into the guide hole.

In some embodiments, the rear end of the elastic locking plate is connected between the right liner and the connecting bone, and the elastic locking plate extends obliquely to the left in a rear section of the locking part.

In some embodiments, the elastic locking plate is made of stainless steel.

The present application has obvious advantages and beneficial effects compared to conventional technology, specifically, from the above technical solution, it can be seen that it mainly designs a locking structure of folding knife based on elastic locking plates, compared with the existing folding knife with an elastic plate locking structure, the locking structure of the folding knife is provided with an unlocking button to push the unlocking spring sheet to deform, so that the unlocking operation of an operator is safer and more convenient; at the same time, there is also a reset spring to assist the unlocking button to reset and keep locking, which may better ensure the safety and reliability of the locking structure;

Secondly, by defining guide grooves on the pivot and arranging the installation position of the elastic locking plate reasonably, the elastic locking plate is prevented from getting stuck, further ensuring the reliability of the unlocking structure, moreover, the reasonable design of the shape of the elastic locking plate further improves the resilience of the elastic locking plate.

To provide a clearer explanation of the structural features and functions of the present invention, the following provides a detailed explanation of the present application in conjunction with the accompanying drawings and specific embodiments.

REFERENCE NUMERALS IN THE DRAWINGS

Figure 1:
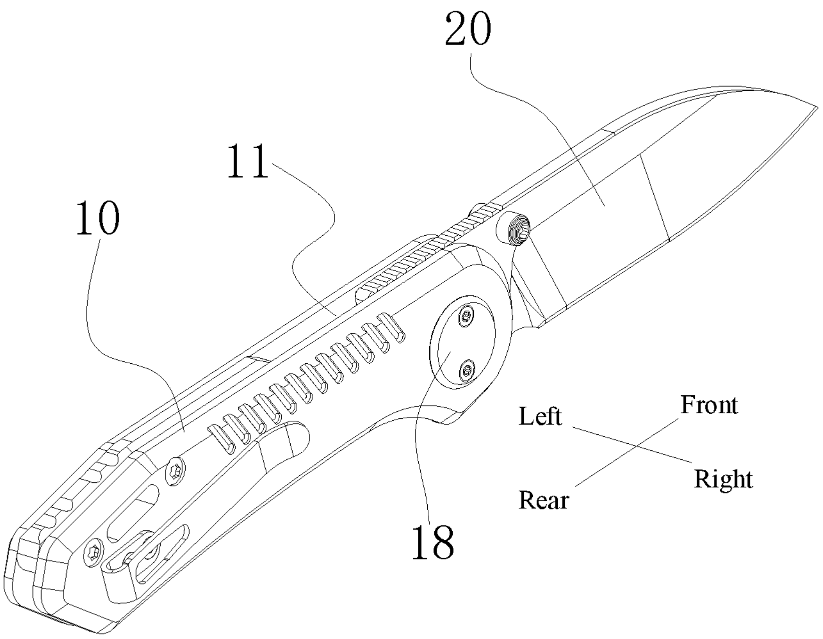
FIG. 1 is a three-dimensional schematic diagram of an embodiment of the present application.
Figure 2:
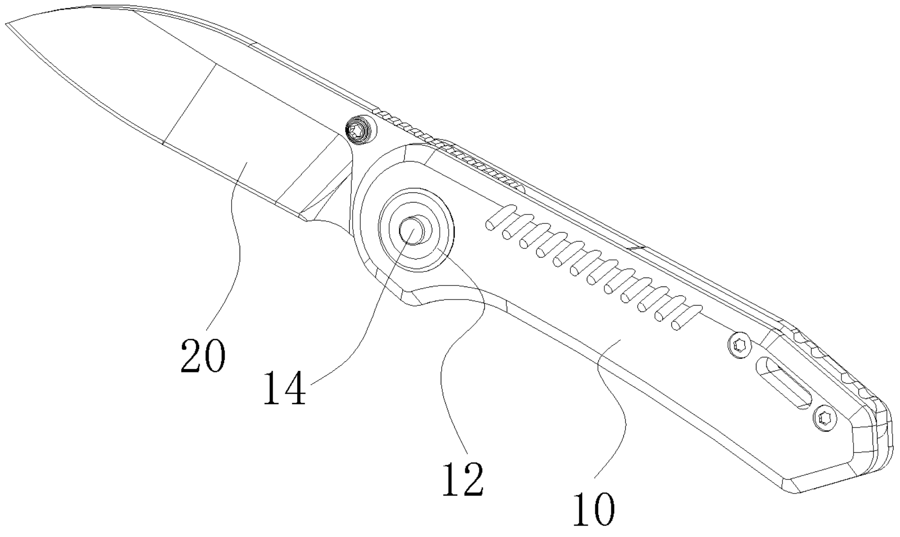
FIG. 2 is a three-dimensional schematic diagram of the embodiment of the present application from another perspective.
Figure 3:
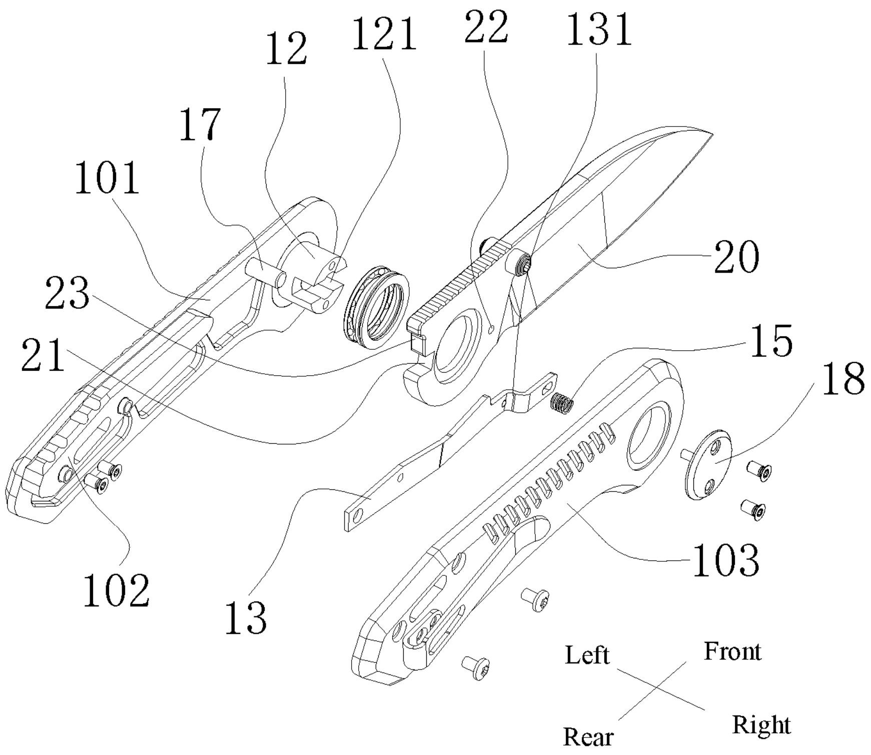
FIG. 3 is a first exploded schematic diagram of the embodiment of the present application.
Figure 4:
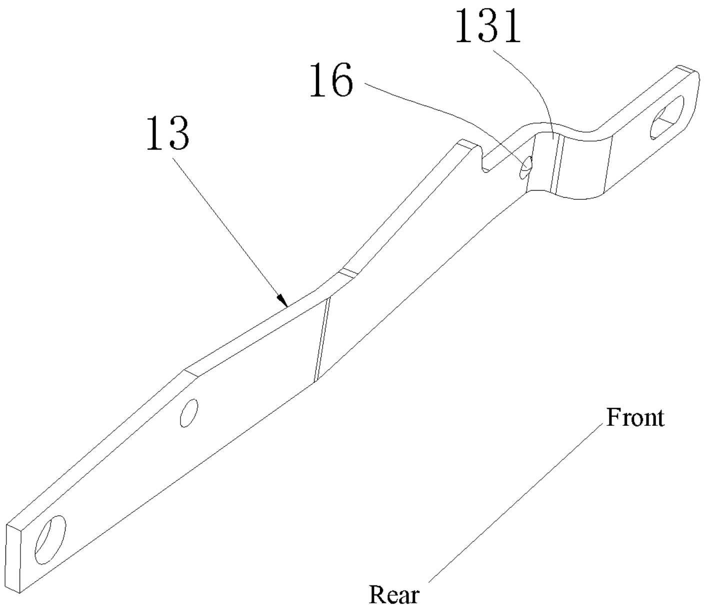
FIG. 4 is a three-dimensional schematic diagram of an elastic locking plate in the embodiment of the present invention.
Figure 5:
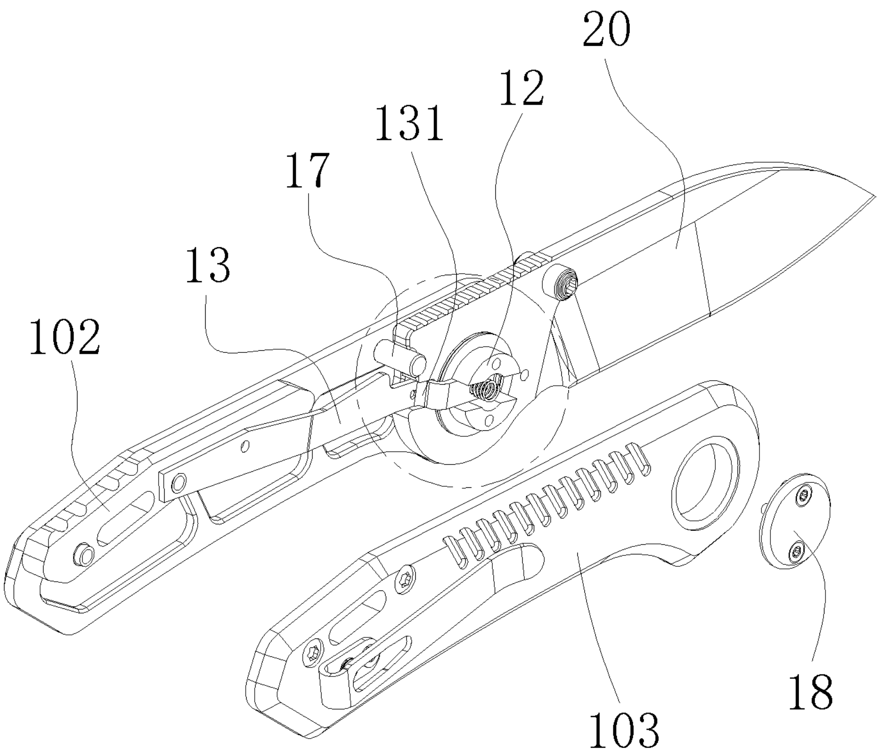
FIG. 5 is a second exploded schematic diagram of the embodiment of the present application.
Figure 6:
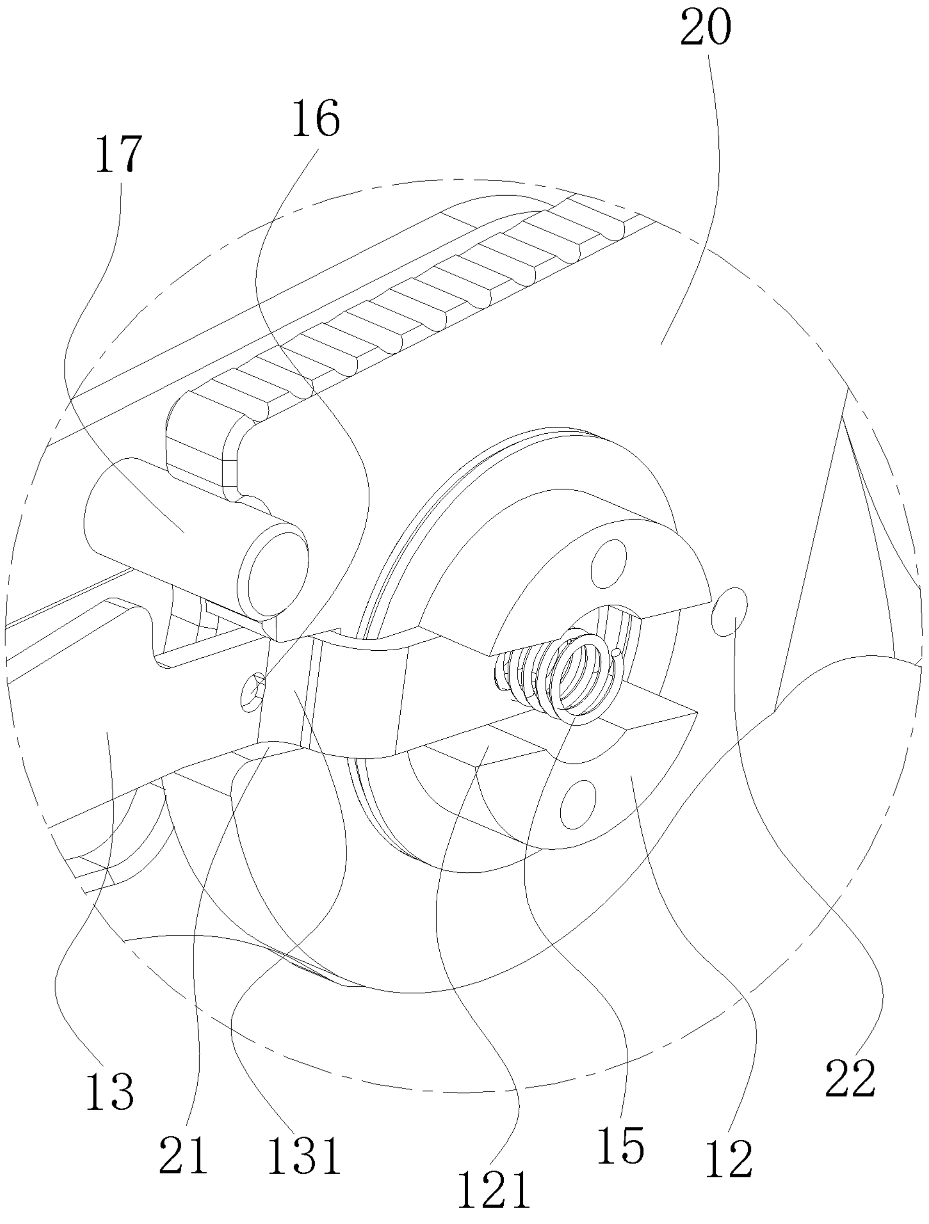
FIG. 6 is a partially enlarged view of FIG. 5.

10, knife handle; 101, left liner; 102, connecting bone; 103, right liner; 11, accommodating groove; 12, pivot; 121, guide groove; 13, elastic locking plate; 131, locking part; 14, unlocking button; 141, guide hole; 15, elastic resetting member; 16, positioning part; 17, limiting post; 18, locking end cover; 181, guide shaft; 20, blade; 21, locking groove; 22, positioning hole; 23, limiting groove.

DETAILED DESCRIPTION OF THE EMBODIMENTS

The following provides a clear and complete description of the technical solution of the present application in conjunction with the accompanying drawings. Obviously, the described embodiments are only preferred embodiments of the present application.

It should be noted that when an element is said to be "fixed" to another element, it may be directly on the other element or there may be an intervening element. When an element is considered to be "connected" to another element, it may be directly connected to another element or intervening elements may exist at the same time. The terms "vertical", "horizontal", "left" and "right" and similar expressions used herein are for illustration purposes only, and do not represent the only embodiment.

Unless otherwise defined, all technical and scientific terms used herein have the same meaning as commonly understood by those skilled in the technical field of the present application. The terminology used in the description of the present application herein is only for the purpose of describing specific embodiments, and is not intended to limit the present application. The term "and/or" used in this article includes any and all combinations of one or more related listed items.

Referring to FIG. 1 to FIG. 11, a locking structure of folding knife based on an elastic locking plate is provided according to the embodiment of the present application, including a knife handle 10 and a blade 20 that can be folded on the knife handle 10, an accommodating groove 11 adapted to the blade 20 is defined on the knife handle, the accommodating groove 11 is provided with a locking structure for locking the blade 20 state; the locking structure includes a pivot 12, an elastic locking plate 13 and an unlocking button 14; the pivot 12 is arranged in the accommodating groove 11, the blade 20 is rotatably connected to the pivot 12, and a guide groove 121 is defined on the pivot 12; the elastic locking plate 13 extends in a front-rear direction, a rear end of the elastic locking plate 13 is fixedly connected with the knife handle 10, a front end of the elastic locking plate 13 is movably arranged in the guide groove 121; the elastic locking plate 13 is provided with a Z-shaped locking part 131, and the blade 20 is provided with a locking groove 21 adapted to the locking part 131;

The unlocking button 14 may be movably arranged on the pivot 12, and one end of the unlocking button 14 abuts against one side of the elastic locking plate 13, the pivot is provided with an elastic resetting member 15 for driving the unlocking button to reset; when the blade 20 is in the unfolded state, the locking part 131 is located in the locking groove 21.

In practical application, the locking part 131 is integrally formed on the elastic locking plate 13; specifically, the locking part 131 may be made on the elastic locking plate 13 through processes such as stamping. Preferably, in order to improve the elasticity of the elastic locking plate 13, the rear section of the elastic locking plate 13 (located at the rear side of the locking part 131) is not a straight plate design, but a plate design extending obliquely with a certain inclination.

Further, the elastic locking plate 13 is provided with a positioning part 16, and the blade 20 is provided with a positioning hole 22 adapted to the positioning part 16. In case that the blade 20 is rotatably accommodated in the knife handle 10, the positioning part 16 is located in the positioning hole 22, so that the blade 20 may be fixed in the accommodated state. The positioning part 16 may be a positioning post or a positioning ball; in this embodiment, the positioning part 16 is a positioning ball, so that when the blade 20 is accommodated, the positioning ball and the surface of the blade 20 are in rolling contact and may not scratch the surface of the blade 20.

Further, the accommodating groove 11 is further provided with a limiting post 17, the blade 20 is provided with a limiting groove 23 matched with the limiting post 17; when the blade 20 is fully unfolded, the limiting groove 23 is limited by the limiting post 17. Therefore, by providing the limiting post 17 and the limiting groove 23, it is also possible to avoid the danger that the blade rotates upward when the tool is used.

Further, the knife handle 10 includes a left liner 101, a connecting bone 102, a right liner 103, the left liner 101 is connected to the left side of the connecting bone 102, and the right liner 103 is connected to the right side of the connecting bone 102; where a rear end of the elastic locking plate 13 is connected between the left liner 101 and the connecting bone 102, or the rear end of the elastic locking plate 13 is connected between the right liner 103 and the connecting bone 102; In the drawings of this embodiment, the rear end of the elastic locking plate 13 is connected between the right liner 103 and the connecting bone 102. The rear section of the elastic locking plate 13 extends obliquely to the left. Moreover, the elastic locking plate 13 is preferably made of stainless steel, which has the advantages of no rust and long service life.

Further, the pivot 12 is provided with a locking end cover 18, and the locking end cover 18 is provided with a guide shaft 181. The elastic resetting member 15 is a spring, and the spring is sleeved on the guide shaft 181, corresponding avoidance holes are defined on the elastic locking plate 13; the unlocking button 14 is provided with a guide hole 141 corresponding to the guide shaft 181. A left end of the guide shaft 181 extends into the guide hole 141 to form a guide structure. The guide shaft 181 provided on the locking end cover 18 has the following advantages, Firstly, the position of the spring is fixed, which ensures the reliability of the spring driving the elastic locking plate 13 to reset. Secondly, the unlocking button 14 is provided with a guide hole 141 adapted to the guide shaft 181, so that the unlocking/locking movement (left-right movement) of the unlocking button 14 is more reliable and stable.

The working principle of unlocking and locking the folding knife of the present application is further explained below:

Referring to FIG. 8 to FIG. 11, when the blade 20 of the folding knife is unfolded and locked, the locking part 131 of the elastic locking plate 13 is positioned in the locking groove 21 of the blade 20. In case of pressing the unlocking button 14, the unlocking button 14 moves to the right and pushes the front end of the elastic locking plate 13 to move to the right. And at this point, under the push of unlocking button 14, the spring compresses and accumulates force, when the unlocking button 14 is pressed in place, the locking part 131 of the elastic locking plate 13 also disengages from the locking groove 21 of the blade 20, achieving unlocking. The blade 20 may be rotated and folded into the accommodating groove 11.

Figure 7:
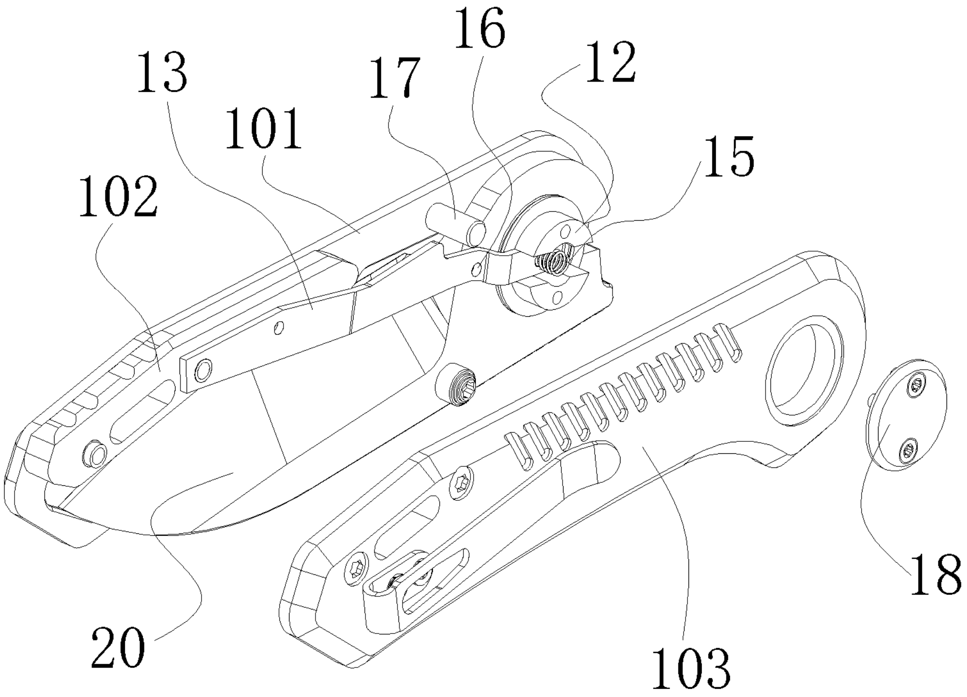
FIG. 7 is a third exploded schematic diagram of the embodiment of the present application (folded state)
Figure 8:
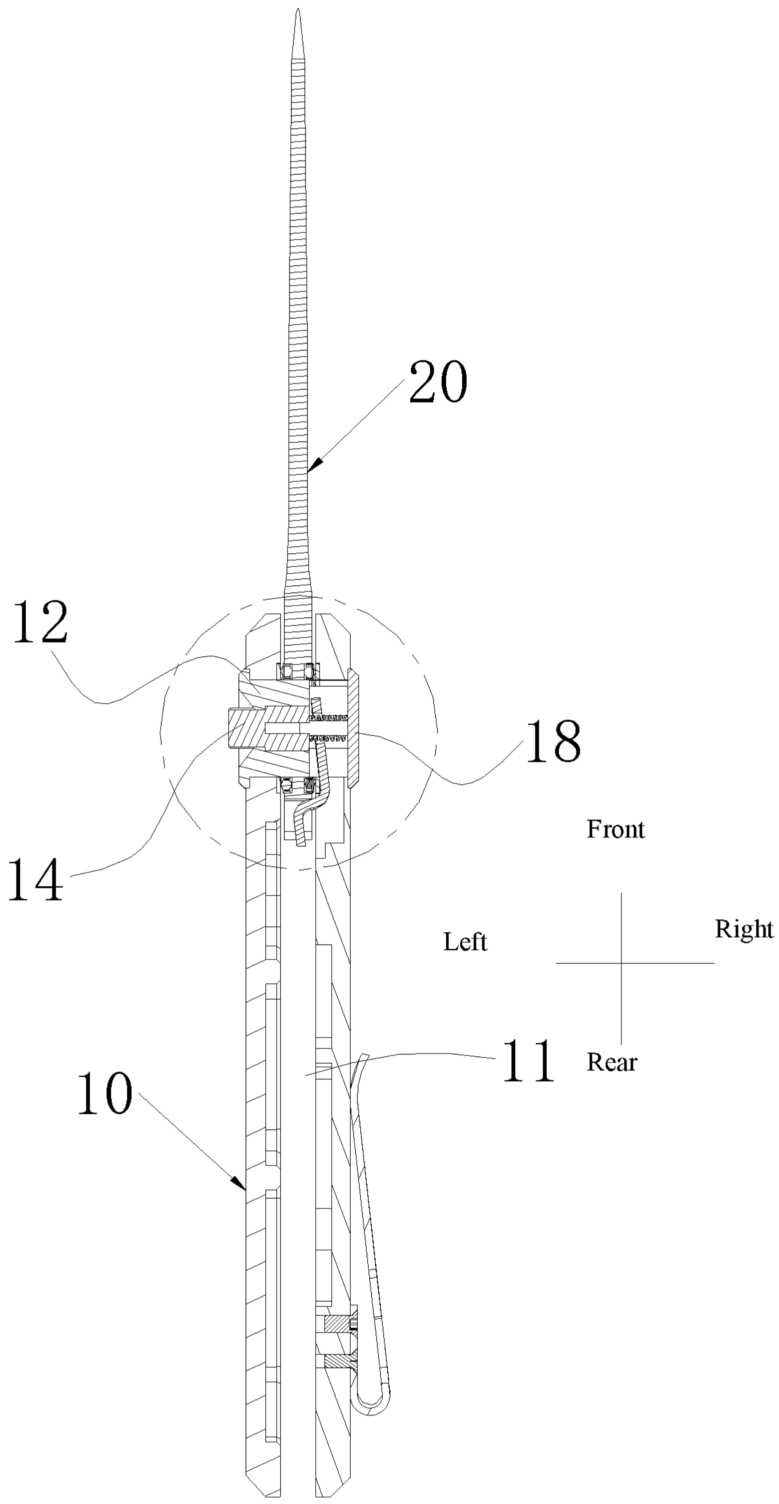
FIG. 8 is a first cross-sectional schematic diagram of the embodiment of the present application.
Figure 9:
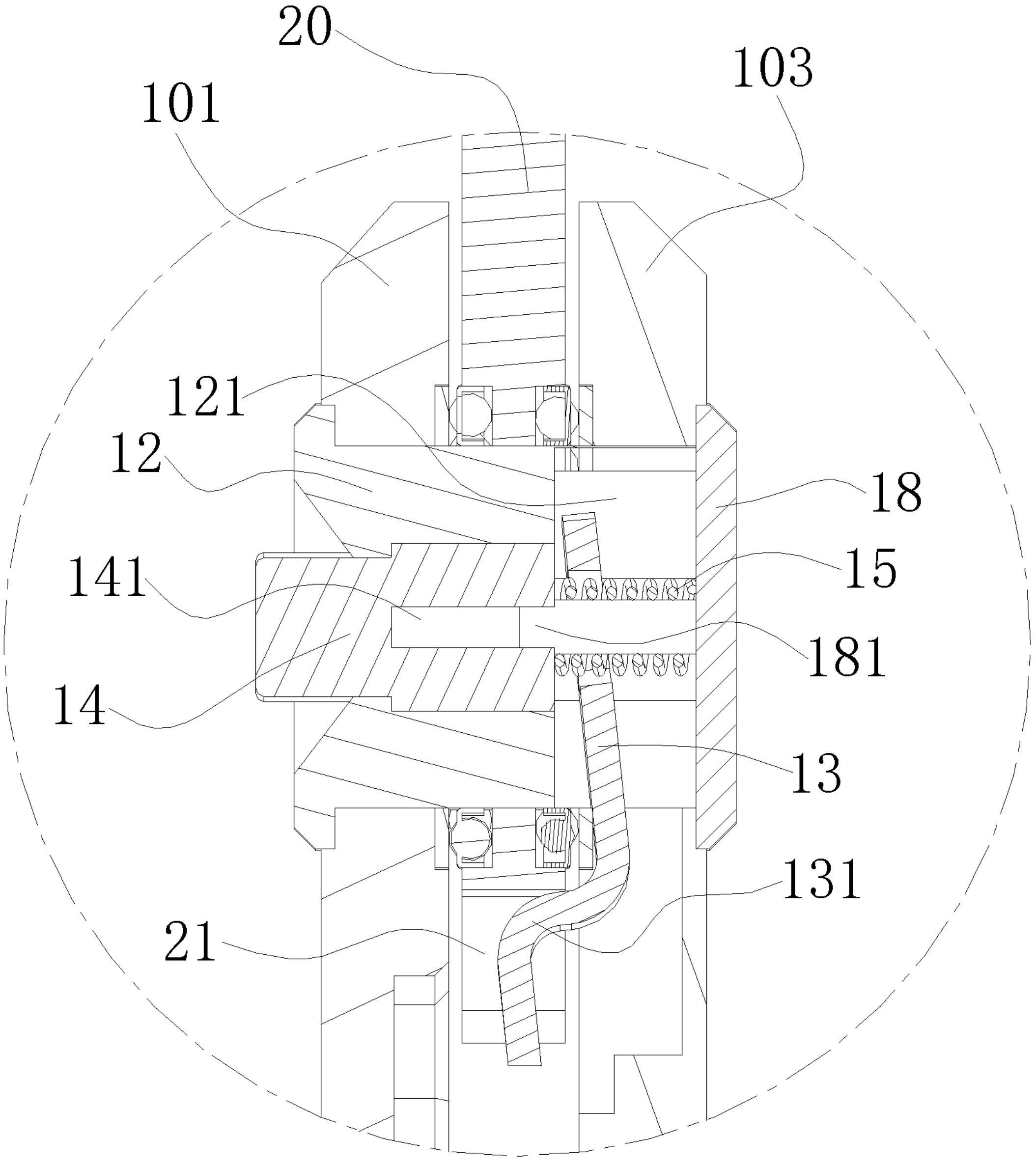
FIG. 9 is a partially enlarged view of FIG. 8.
Figure 10:
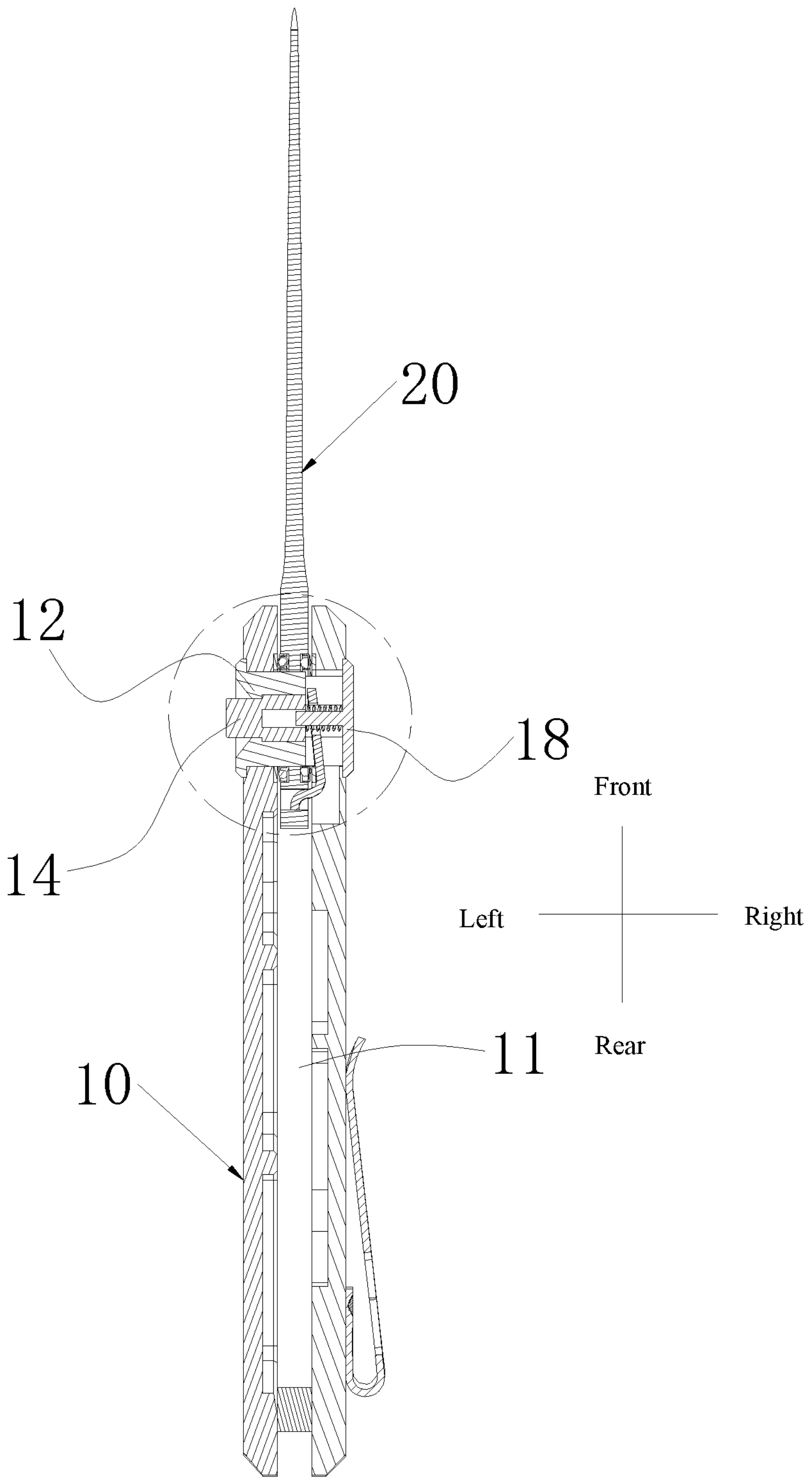
FIG. 10 is a second cross-sectional schematic diagram of the embodiment of the present application.
Figure 11:
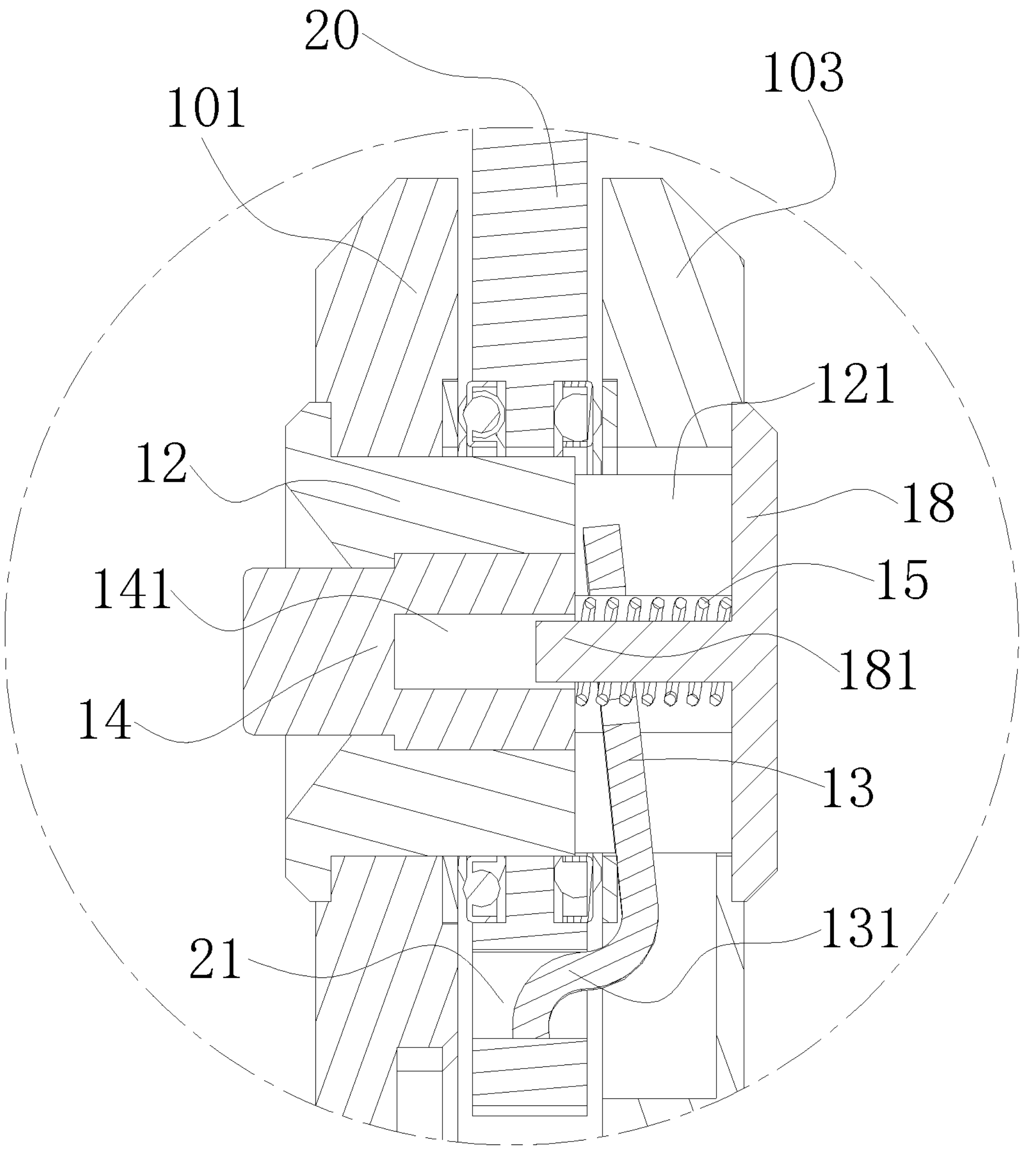
FIG. 11 is a partially enlarged view of FIG. 10.

Referring to FIG. 7, when the blade 20 is folded into the accommodating groove 11, the positioning part 16 of the elastic locking plate 13 is positioned in the positioning hole 22 of the blade 20, thereby achieving the locking of the blade 20; in case of unlocking and unfolding, the unlocking button 14 is pressed to separate the positioning part 16 of the elastic locking plate 13 from the positioning hole 22 of the blade 20, and then rotate the blade 20 accordingly; in case of fully unfolding the blade 20, the limiting groove 23 of the blade 20 is limited by the limiting post 17 of the knife handle 10. Due to the elastic force of the elastic locking plate 13, the locking part 131 of the elastic locking plate 13 is also locked in the locking groove 21 of the blade 20.

It should be added that in practical application, the front end of the elastic locking plate 13 may also be fixedly connected to the pivot 12. The part pushed by the unlocking button 14 corresponds to the locking part 131 of the elastic locking plate 13 (the locking part 131 of the elastic locking plate 13 is arranged in the middle of the elastic locking plate 13). In this way, the two ends of the elastic locking plate 13 are locked (forming the bridge piers at both ends), and the locking part 131 is bent and arched, similar to a bridge shaped design, which may further improve the rebound performance of the elastic locking plate 13.

The design emphasis of the present application lies in that, it mainly designs a locking structure of folding knife based on elastic locking plates, compared with the existing folding knife with an elastic plate locking structure, the locking structure of the folding knife is provided with an unlocking button to push the unlocking spring sheet to deform, so that the unlocking operation of an operator is safer and more convenient; at the same time, there is also a reset spring to assist the unlocking button to reset and keep locking, which may better ensure the safety and reliability of the locking structure;

Secondly, by defining guide grooves on the pivot and arranging the installation position of the elastic locking plate reasonably, the elastic locking plate is prevented from getting stuck, further ensuring the reliability of the unlocking structure, moreover, the reasonable design of the shape of the elastic locking plate further improves the resilience of the elastic locking plate.

The above is only the preferred embodiment of the present application, and does not limit the technical scope of the present application. Therefore, any slight modification, equivalent change and modification of the above embodiment according to the technical essence of the present application still falls within the scope of the technical scheme of the present application.

What is claimed is:

1. A folding knife, comprising a knife handle and a blade capable of being folded on the knife handle, an accommodating groove adapted to the blade is defined on the knife handle, the accommodating groove is provided with a locking structure for locking the blade in a locked state; wherein the locking structure comprises a pivot, an elastic locking plate and an unlocking button;

wherein the pivot is arranged in the accommodating groove, the blade is rotatably connected to the pivot, and a guide groove is defined on the pivot;

wherein the elastic locking plate extends in a front-rear direction, a rear end of the elastic locking plate is fixedly connected with the knife handle, a front end of the elastic locking plate is movably arranged in the guide groove; the elastic locking plate is provided with a Z-shaped locking part, and the blade is provided with a locking groove adapted to the Z-shaped locking part;

wherein the unlocking button can be movably arranged on the pivot, and one end of the unlocking button abuts against one side of the elastic locking plate, the pivot is provided with an elastic resetting member for driving the unlocking button to reset; when the blade is in an unfolded state, the Z-shaped locking part is located in the locking groove.

2. The folding knife according to claim 1, wherein the Z-shaped locking part is integrally formed with the elastic locking plate.

3. The folding knife according to claim 2, wherein the elastic locking plate is provided with a positioning part, the blade is provided with a positioning hole matched with the positioning part, and the positioning part is located in the positioning hole when the blade is rotatably accommodated in the knife handle.

4. The folding knife according to claim 2, wherein the accommodating groove is further provided with a limiting post, the blade is provided with a limiting groove matched with the limiting post; when the blade is fully unfolded, the limiting groove is limited by the limiting post.

5. The folding knife according to claim 2, wherein the knife handle comprises a left liner, a connecting bone, a right liner, the left liner is connected to the left side of the connecting bone, and the right liner is connected to the right side of the connecting bone;

wherein a rear end of the elastic locking plate is connected between the left liner and the connecting bone, or the rear end of the elastic locking plate is connected between the right liner and the connecting bone.

6. The folding knife according to claim 5, wherein the pivot is provided with a locking end cover, the locking end cover is provided with a guide shaft, the elastic resetting member is a spring, and the spring is sleeved on the guide shaft; the unlocking button is provided with a guide hole corresponding to the guide shaft, and the guide shaft extends into the guide hole.

7. The folding knife according to claim 6, wherein the rear end of the elastic locking plate is connected between the right liner and the connecting bone.

8. The folding knife according to claim 7, wherein the elastic locking plate is made of stainless steel.

* * * * *